United States Patent
Fukano et al.

(10) Patent No.: US 9,550,262 B2
(45) Date of Patent: Jan. 24, 2017

(54) ELECTRIC CLAMP APPARATUS

(71) Applicant: SMC KABUSHIKI KAISHA, Chiyoda-ku (JP)

(72) Inventors: Yoshihiro Fukano, Moriya (JP); Noriyuki Miyazaki, Kashiwa (JP); Takeshi Seo, Nagareyama (JP)

(73) Assignee: SMC KABUSHIKI KAISHA, Chiyoda-ku (JP)

( * ) Notice: Subject to any disclaimer, the term of this patent is extended or adjusted under 35 U.S.C. 154(b) by 8 days.

(21) Appl. No.: 14/401,632

(22) PCT Filed: Jun. 17, 2013

(86) PCT No.: PCT/JP2013/067152
§ 371 (c)(1),
(2) Date: Nov. 17, 2014

(87) PCT Pub. No.: WO2014/010391
PCT Pub. Date: Jan. 16, 2014

(65) Prior Publication Data
US 2015/0165577 A1   Jun. 18, 2015

(30) Foreign Application Priority Data
Jul. 13, 2012   (JP) ................................. 2012-157272

(51) Int. Cl.
*B25B 1/02* (2006.01)
*B23Q 3/06* (2006.01)
(Continued)

(52) U.S. Cl.
CPC . *B23Q 3/06* (2013.01); *B23Q 1/26* (2013.01); *B25B 5/04* (2013.01); *B25B 5/06* (2013.01); *B25B 5/108* (2013.01); *B25B 5/16* (2013.01)

(58) Field of Classification Search
CPC .............. B25B 5/122; B25B 5/16; B25B 5/06; B25B 5/04; B25B 5/108; B23Q 3/06; B23Q 1/26
(Continued)

(56) References Cited

U.S. PATENT DOCUMENTS 5,033,552 A * 7/1991 Hu .......................... B25B 21/00
                                                        173/170
5,516,087 A    5/1996 Schmid et al.
(Continued)

FOREIGN PATENT DOCUMENTS

JP    7-185979 A    7/1995
JP    2004-255559 A    9/2004
(Continued)

OTHER PUBLICATIONS

Combined Office Action and Search Report issued Sep. 6, 2015 in Chinese Patent Application No. 201380034506.8 (with English language translation).
(Continued)

*Primary Examiner* — Monica Carter
*Assistant Examiner* — Nirvana Deonauth
(74) *Attorney, Agent, or Firm* — Oblon, McClelland, Maier & Neustadt, L.L.P.

(57) ABSTRACT

In an electric clamp apparatus, a drive unit including a motor is disposed on an end of a body on which a clamp arm is rotatably supported. The drive unit includes a hollow housing connected to the body, and a motor unit, which is configured to be accommodated in the interior of the housing. After the motor unit has been inserted into the interior of the housing from one end side thereof, two lock plates, which are disposed on a frame of the motor unit, are rotated, whereby holes of the lock plates are made to engage with
(Continued)

projections of the housing. As a result, the motor unit is fixed in a state of being accommodated in the housing.

9 Claims, 10 Drawing Sheets

(51) Int. Cl.
*B25B 5/10* (2006.01)
*B25B 5/16* (2006.01)
*B23Q 1/26* (2006.01)
*B25B 5/04* (2006.01)
*B25B 5/06* (2006.01)

(58) Field of Classification Search
USPC .............................. 269/52, 32, 27, 24, 228
See application file for complete search history.

(56) References Cited

U.S. PATENT DOCUMENTS

| | | |
|---|---|---|
| 6,354,580 B1 | 3/2002 | Nagai et al. |
| 2004/0041324 A1* | 3/2004 | Fukui ........................ B25B 5/16 269/32 |
| 2004/0231870 A1* | 11/2004 | McCormick .............. B25B 5/12 173/217 |
| 2005/0104268 A1 | 5/2005 | Migliori |
| 2005/0126865 A1 | 6/2005 | Sato et al. |
| 2011/0083868 A1 | 4/2011 | Nishikimi et al. |

FOREIGN PATENT DOCUMENTS

| | | |
|---|---|---|
| JP | 2005-169604 | 6/2005 |
| KR | 10-2014-0107572 A | 9/2014 |
| SU | 1054013 A | 11/1983 |
| WO | 03/011529 A1 | 2/2003 |

OTHER PUBLICATIONS

Office Action issued Dec. 2, 2014 in Japanese Patent Application No. 2012-157272 (with partial English language translation).
International Search Report and Written Opinion issued Oct. 17, 2013 in PCT/JP2013/067152 filed Jun. 17, 2013.
Notice of Decision for Patent issued Jun. 22, 2016 in Korean Patent Application No. 10-2015-7000573 (with partial English language translation).
Combine Russian Federation Office Action and Search Report issued Jun. 9, 2016 in Patent Application No. 2015100049/02(000069) (with English translation).

* cited by examiner

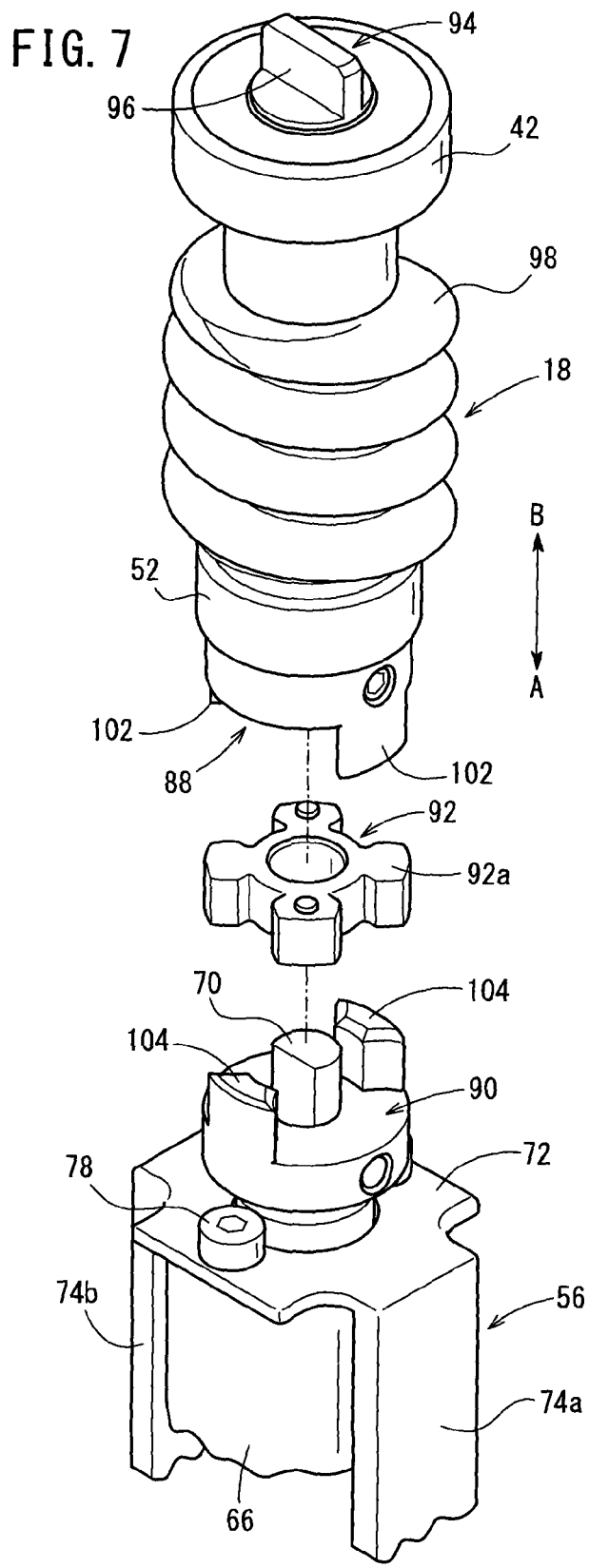

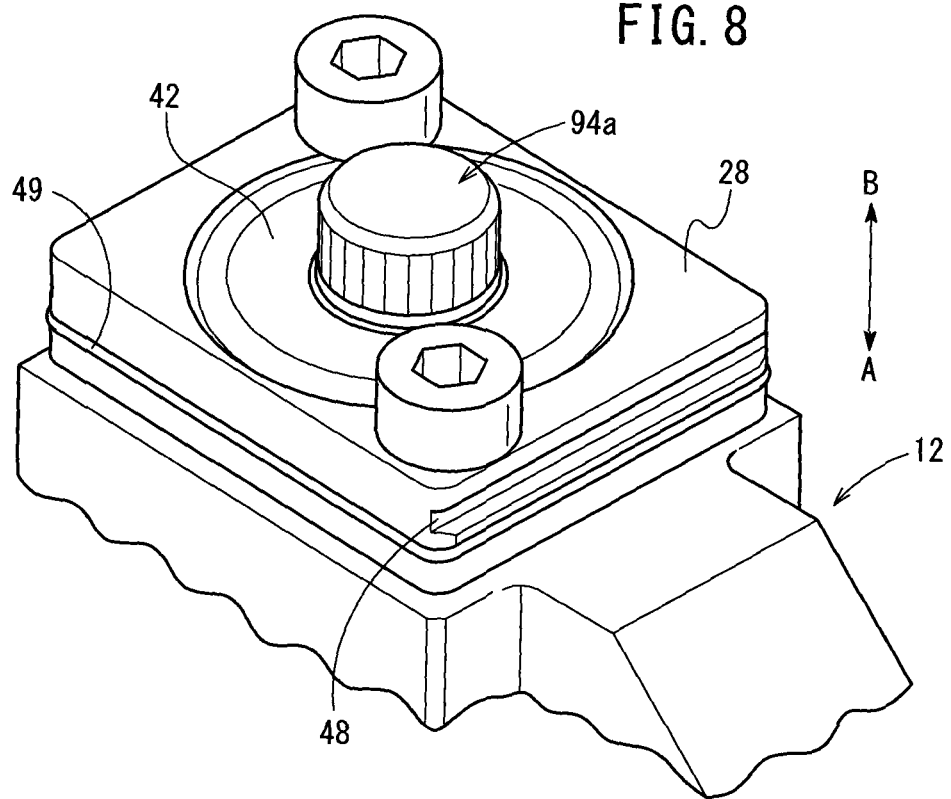

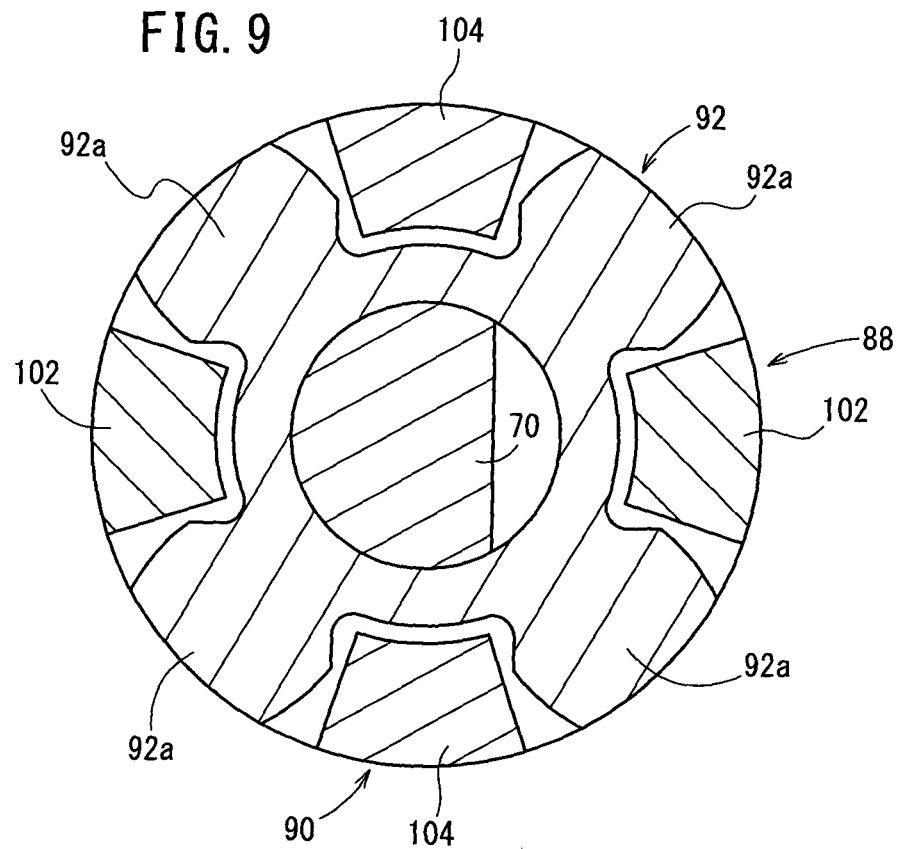

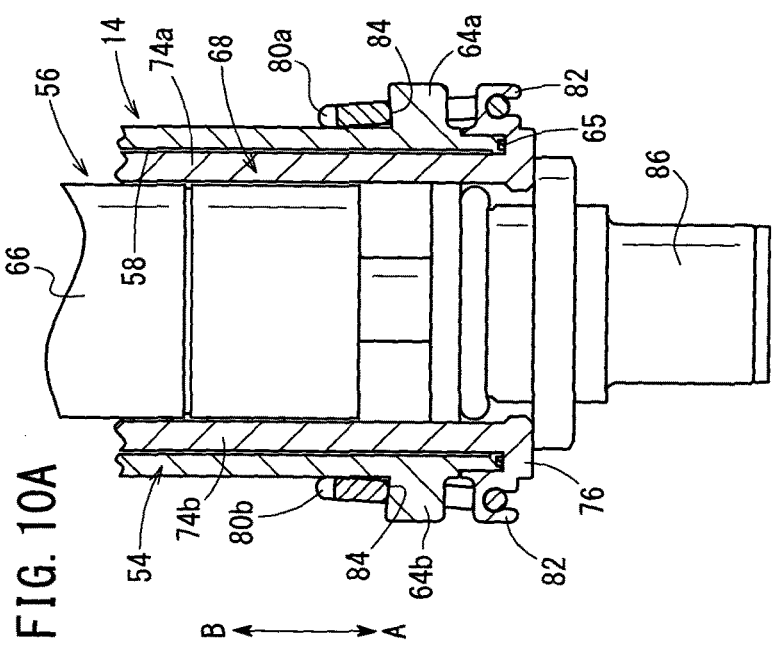

ELECTRIC CLAMP APPARATUS

TECHNICAL FIELD

The present invention relates to an electric clamp apparatus which is capable of clamping a workpiece on an automated assembly line or the like.

BACKGROUND ART

Heretofore, in an automated assembly line for automobiles, clamping by a clamp apparatus has been carried out, in a state in which pre-formed body panels are overlapped and positioned, and an assembly step is carried out whereby the body panels are welded together.

The present applicant has proposed an electric clamp apparatus, as disclosed in Japanese Laid-Open Patent Publication No. 2005-169604. In such an electric clamp apparatus, a clamp arm is disposed rotatably on a body equipped with an electric motor, and by transmitting a rotary driving force of the electric motor through a speed-reducing drive system, the clamp arm is rotated to clamp a workpiece.

SUMMARY OF INVENTION

A general object of the present invention is to provide an electric clamp apparatus, in which a change in the driving force of the electric clamp apparatus can easily be carried out, together with improving ease of maintenance of the electric clamp apparatus.

The present invention is characterized by an electric clamp apparatus for gripping a workpiece by rotation of a clamp arm, comprising:

a body;

a drive unit including a drive source that is driven rotatably by an electric signal, the drive unit being attachable and detachable with respect to the body;

a driving force transmission mechanism disposed in interior of the body, which transmits a rotary driving force of the drive unit to the clamp arm; and a connecting mechanism for switching a state of connection of the drive unit with respect to the body, wherein the drive unit is attachable and detachable with respect to the body by switching a state of connection of the drive unit through use of the connecting mechanism.

According to the present invention, in an electric clamp apparatus having the aforementioned drive unit, which is driven rotatably by an electric signal, the driving force transmission mechanism that transmits the rotary driving force of the drive unit to the clamp arm can be disposed in the interior of the body, and the state of connection between the body and the drive unit can be switched through operation of the connecting mechanism.

Accordingly, in the case that a maintenance operation such as exchange of the drive unit or the like is to be carried out, since the connection between the body and the drive unit by the connecting mechanism can easily be released, for example, in comparison with a conventional clamp apparatus in which the body and the drive unit are connected by fasteners such as bolts or the like, it is unnecessary to carry out complicated operations such as removal of bolts, and owing thereto, ease of maintenance of the electric clamp apparatus can be enhanced. Further, by removal of the drive unit from the body and replacement thereof with a different drive unit, a change in the output of the drive unit in the same clamp apparatus can be implemented.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF DRAWINGS

FIG. 7 is an exploded perspective view showing a driving force transmission mechanism and a drive unit that constitute part of the electric clamp apparatus of FIG. 1;

FIG. 8 is an enlarged perspective view of the electric clamp apparatus in which an operation bolt according to a modified example is used;

FIG. 9 is a cross sectional view taken along line IX-IX of FIG. 2;

FIG. 10A is an enlarged cross sectional view showing a connected state in which a motor unit is accommodated with respect to a housing in the drive unit; and FIG. 10B is an enlarged cross sectional view showing a condition in which the motor unit is taken out in a downward direction with respect to the housing shown in FIG. 10A.

DESCRIPTION OF EMBODIMENTS

Figure 1:
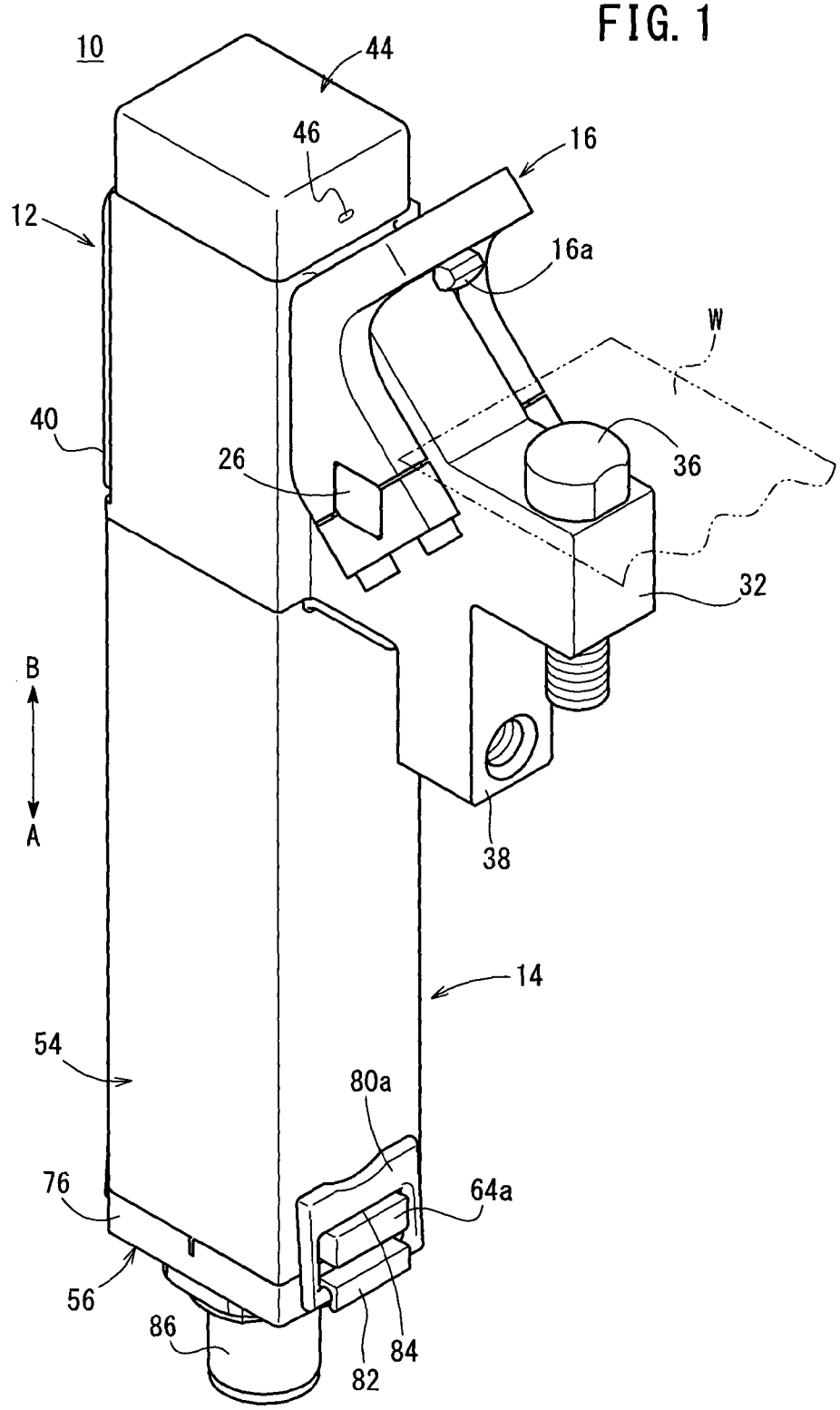
FIG. 1 is an exterior perspective view of an electric clamp apparatus according to an embodiment of the present invention.

As shown in FIGS. 1 through 5, an electric clamp apparatus 10 includes a body 12, a drive unit 14 provided on a lower portion of the body 12, a clamp arm 16 disposed rotatably with respect to the body 12, and a driving force transmission mechanism 18 disposed in the interior of the body 12 and which transmits a driving force to the clamp arm 16 from the drive unit 14.

The body 12 is formed from a metal material, for example, with a shaft 20 and a worm gear 22 that constitute the driving force transmission mechanism 18 being accommodated in a vertical direction (the direction of arrow A or B) in a space defined in the interior of the body 12. Further, a worm wheel 24 is disposed rotatably through a support shaft 26 on one side of the worm gear 22 in the body 12.

Further, the body 12 includes first and second retaining members 28, 30 formed coaxially on upper and lower portions thereof, and a bulging portion 32, which projects outwardly with respect to one side of the body 12, and is disposed between the first retaining member 28 and the second retaining member 30. The bulging portion 32 includes a screw hole 34 that penetrates vertically through a region of the bulging portion 32 that projects in a substantially horizontal direction. A support pin 36 is screw-engaged from above in the screw hole 34.

In addition, a clamping member 16a of the clamp arm 16 is capable of retaining a workpiece W by coming into abutment against an upper portion of the workpiece W. An attachment part 38 that extends in a vertical downward direction (in the direction of the arrow A) is formed beneath the bulging portion 32. The attachment part 38 may be used when the electric clamp apparatus 10 is fixed to a wall surface by means of bolts or the like.

Further, a side wall of the body 12 opens on an opposite side of the body 12 from the bulging portion 32. The open side wall is closed by mounting a lid member 40 thereon.

A first bearing 42 is held by the first retaining member 28, and a cover member 44 is mounted thereon from above so as to cover the first retaining member 28. The cover member 44 is hollow with a substantially U-shape in cross section. The cover member 44 is installed on the first retaining member 28 such that the open end thereof is oriented toward the side of the body 12 (in the direction of the arrow A). Further, a pair of projections 46 that project from the inner wall surface is formed in the open end of the cover member 44. The projections 46 are engaged respectively with a pair of grooves 48 formed on the side surface of the first retaining member 28.

More specifically, the cover member 44 is mounted so as to cover the first retaining member 28 of the body 12, and is retained by engagement of the projections 46 in the grooves 48. The cover member 44 is mounted in a detachable manner with respect to the first retaining member 28.

Figure 5:
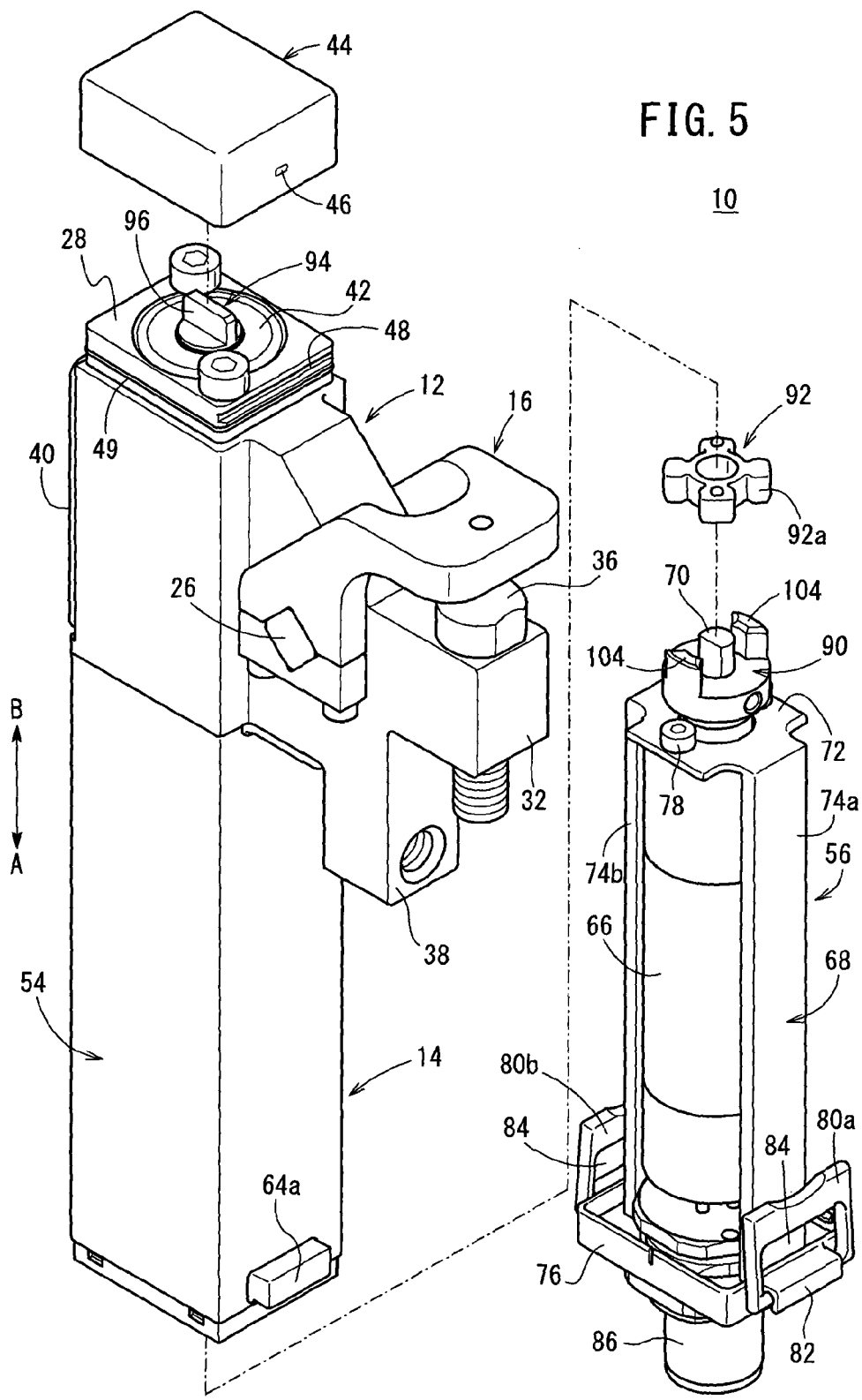
FIG. 5 is a partially exploded perspective view of the electric clamp apparatus shown in FIG. 1.

Further, as shown in FIGS. 5 and 8, a sealing ring 49 is mounted through a groove on an outer peripheral surface of the first retaining member 28. When the cover member 44 is installed, by abutment of the sealing ring 49 against the inner wall surface of the cover member 44, a sealed condition is maintained between the cover member 44 and the first retaining member 28.

Figure 6:
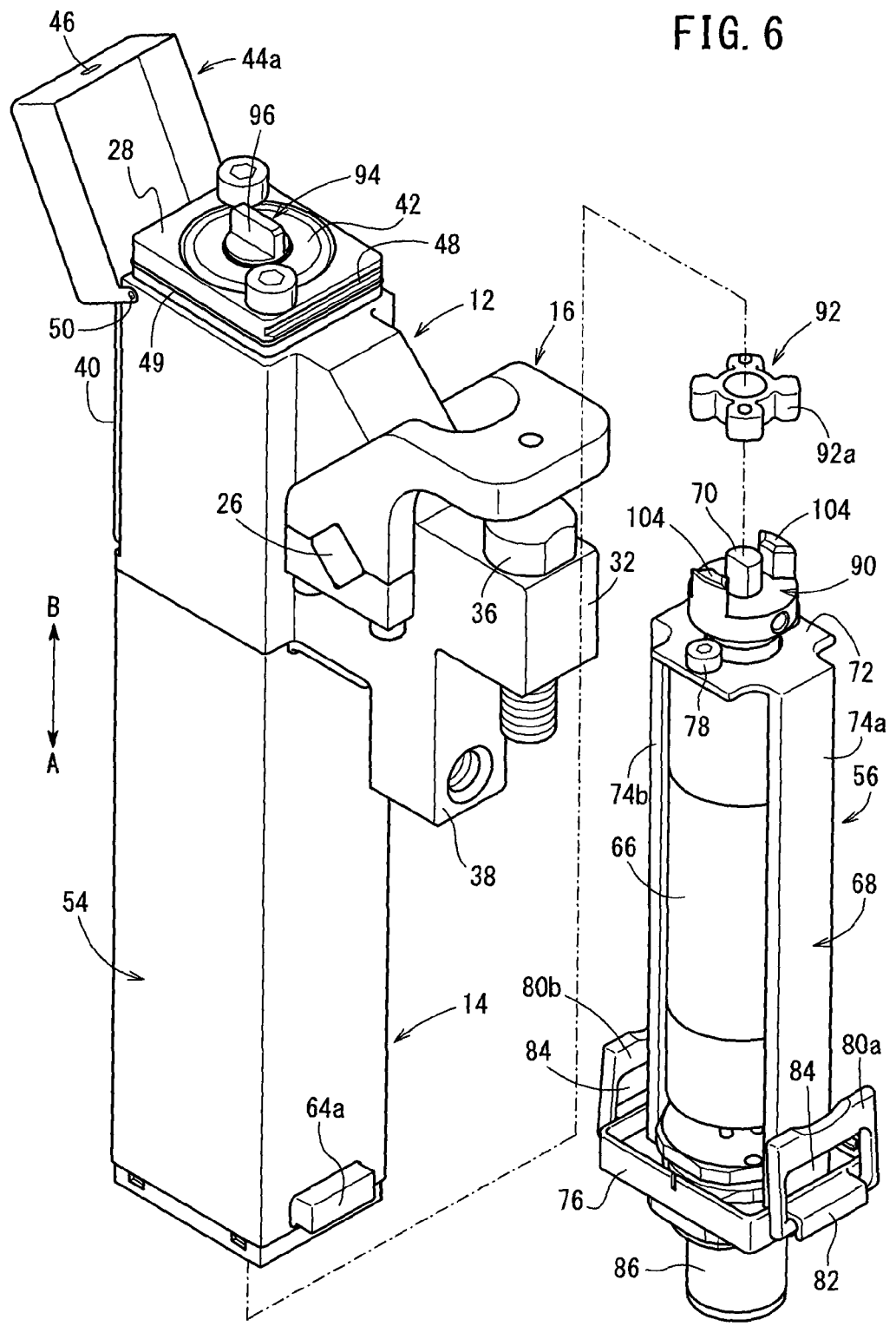
FIG. 6 is an enlarged perspective view of the electric clamp apparatus in which a cover member according to a modified example is used.

The cover member 44 is not limited to having a detachable structure with respect to the first retaining member 28 as has been described above. For example, as shown in FIG. 6, a cover member 44a may be used which is supported rotatably by a pin 50 provided on one end side with respect to the first retaining member 28.

When a later-described operation bolt 94 is to be operated, by means of an operator (not shown) gripping the cover member 44a from another end side thereof and lifting the cover member 44a upwardly, engagement between the projection 46 and the groove 48 is released, whereby the cover member 44a can be opened by rotation thereof about the pin 50. By providing such a structure, since the cover member 44a is normally retained on the body 12 through the pin 50, there is no need to consider providing a location for placement of the cover member 44a after removal thereof, and loss of the cover member 44a can be prevented.

As shown in FIGS. 1 through 5, the second retaining member 30 is formed below the first retaining member 28 (in the direction of the arrow A) and is separated by a predetermined distance with respect to the first retaining member 28, and a second bearing 52 is retained thereon coaxially with the first bearing 42. The first and second bearings 42, 52 rotatably support respective opposite ends of the shaft 20 that constitutes the driving force transmission mechanism 18.

The drive unit 14 includes a housing (body) 54, which is made up from a tubular body having a rectangular shape in cross section, and a motor unit (drive unit) 56, which is capable of being accommodated in the interior of the housing 54. The housing 54 comprises a first accommodating section 58 in which the motor unit 56 is accommodated, and a second accommodating section 60 formed on an upper part of the first accommodating section 58 and in which a portion of the driving force transmission mechanism 18 is accommodated. An upper part of the second accommodating section 60 is connected to a lower end of the body 12. The housing 54 is connected with respect to the body 12 by a plurality of fastening bolts, not shown.

Further, between the first accommodating section 58 and the second accommodating section 60, a partition wall 62 is formed, which is disposed perpendicularly with respect to the axial direction (the direction of arrow A or B) of the housing 54.

The first accommodating section 58 is formed with a rectangular shape in cross section, for example, extending with substantially the same sectional area along the axial direction. In the vicinity of the lower end thereof, two projections 64a, 64b are formed, which project at right angles with respect to side surfaces of the first accommodating section 58. The projections 64a, 64b are formed with elongate shapes in cross section extending in a widthwise direction perpendicular to the axial direction (the direction of arrow A or B) of the housing 54, and are formed respectively on one side surface and another side surface in opposite relation to each other while sandwiching the first accommodating section 58 therebetween. In this case, the projections 64a, 64b are formed on one side surface of the housing 54, which is on the same side as the bulging portion 32 of the body 12, and on another side surface of the housing 54, which is on a side opposite from the bulging portion 32.

Further, an annular sealing ring 65 is mounted via a groove on the lower end of the housing 54. In addition, when the motor unit 56 is assembled with respect to the housing 54, the sealing ring 65 is placed in abutment against a holder 76 (described later) of a frame 68 that constitutes the motor unit 56, whereby a sealed condition between the motor unit 56 and the housing 54 is ensured.

The motor unit 56 includes a motor (drive source) 66, which is made up, for example, from a DC motor or a stepping motor having a predetermined length in the axial direction, and the frame 68 that serves to retain the motor 66.

The motor 66 is accommodated in the first accommodating section 58 so that a drive shaft 70 thereof is oriented upwardly (in the direction of the arrow B). Further, the drive shaft 70, for example, is formed with a semi-circular shape in cross section, with a portion of the outer circumferential surface thereof being cut out. The drive shaft 70 is inserted through a side of the second accommodating section 60 via the partition wall 62.

The frame 68 includes an upper wall portion 72, a pair of side wall portions 74a, 74b disposed perpendicularly with respect to the upper wall portion 72, and the holder 76, which is joined to ends of the side wall portions 74a, 74b. Further, the frame 68 is formed with a hollow shape that opens in respective lateral directions, such that the upper wall portion 72, the side wall portions 74a, 74b, and the holder 76 are provided respectively on outer sides of the motor 66, and the frame 68 is mounted so as to cover both ends and a portion of the side of the motor 66.

The upper wall portion 72 is arranged on the upper end side (in the direction of the arrow B) of the motor 66 from which the drive shaft 70 projects, and is fixed to the motor 66 by a bolt 78. The side wall portions 74a, 74b are arranged substantially in parallel along the outer circumferential surface of the motor 66, and extend a predetermined length downwardly (in the direction of the arrow A) from the upper wall portion 72.

The holder 76 is formed so as to be expanded in width with respect to the upper wall portion 72 and the side wall portions 74a, 74b, and is arranged in confronting relation to the lower end of the motor 66. Further, the holder 76 is arranged substantially in parallel with the upper wall portion 72, with a pair of lock plates (plates) 80a, 80b being disposed rotatably on one side surface and another side surface of the holder 76.

The lock plates 80a, 80b, for example, are made up from substantially rectangular shaped plates, with lower ends thereof being retained in support members 82 formed on one side surface and the other side surface of the holder 76. The lock plates 80a, 80b are supported rotatably, and are formed with substantially rectangular shaped holes 84 that open roughly in the center thereof.

In addition, in a state in which the motor unit 56 is accommodated in the first accommodating section 58 of the housing 54, the two lock plates 80a, 80b are arranged in confronting relation to the projections 64a, 64b of the housing 54, and by rotation of the lock plates 80a, 80b, the projections 64a, 64b are inserted respectively through the holes 84. Consequently, the motor unit 56 is fixed with respect to the housing 54 through engagement of the lock plates 80a, 80b with the projections 64a, 64b.

Stated otherwise, by engagement of the lock plates 80a, 80b with respect to the projections 64a, 64b, movement of the motor unit 56 in the axial direction (the direction of arrows A and B) with respect to the housing 54 is restricted.

Further, a connector 86, which projects in a downward direction, is formed on a lower portion of the holder 76. The connector 86 communicates with the first accommodating section 58, and non-illustrated terminals in the connector 86 are connected electrically to the motor 66. In addition, on the connector 86, a non-illustrated coupler thereof is connected to a controller, such that electrical signals from the controller are input via the coupler to the motor 66, thereby driving the motor 66 rotationally.

Figure 2:
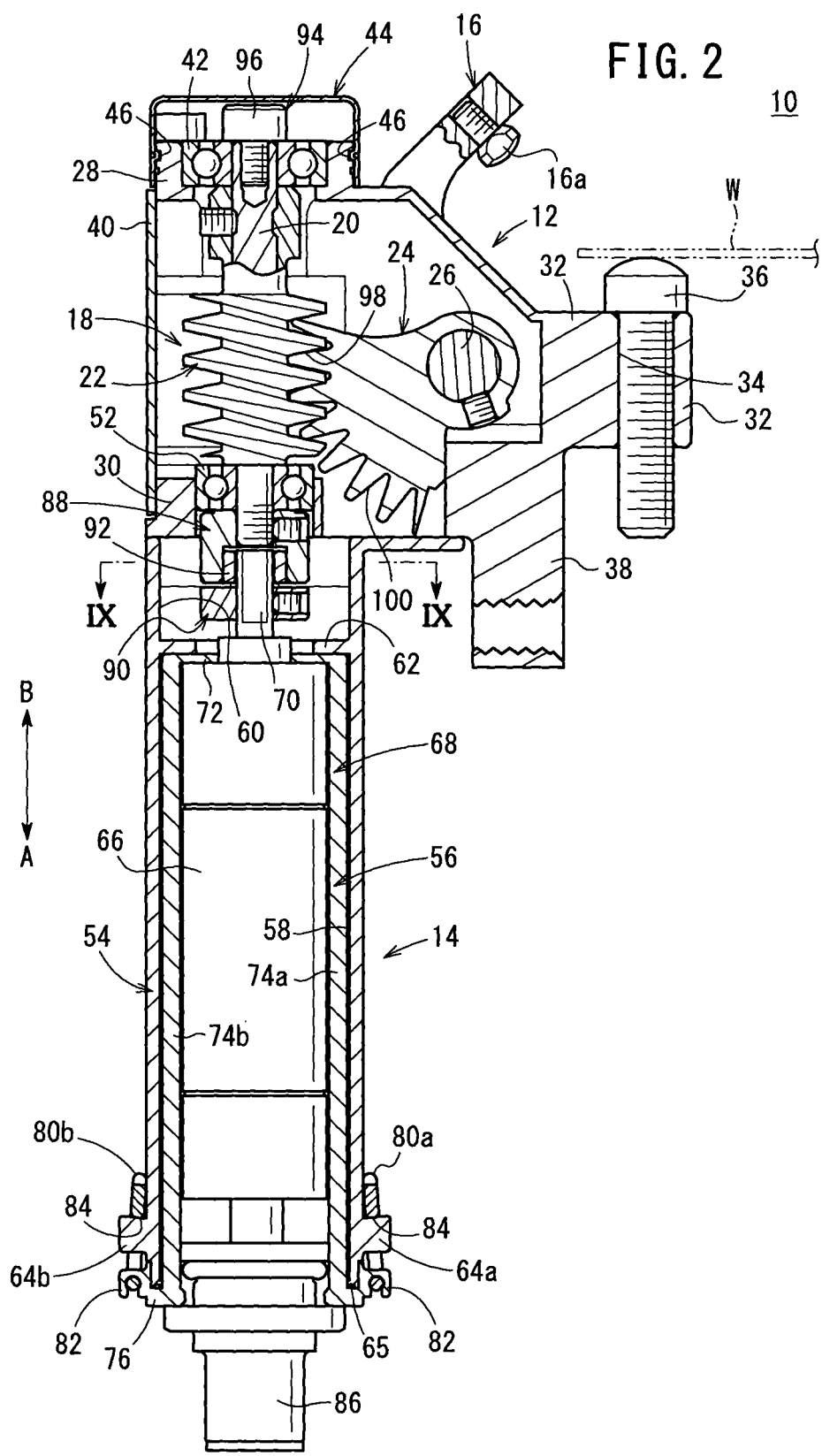
FIG. 2 is an overall vertical cross sectional view of the electric clamp apparatus of FIG. 1.
Figure 4:
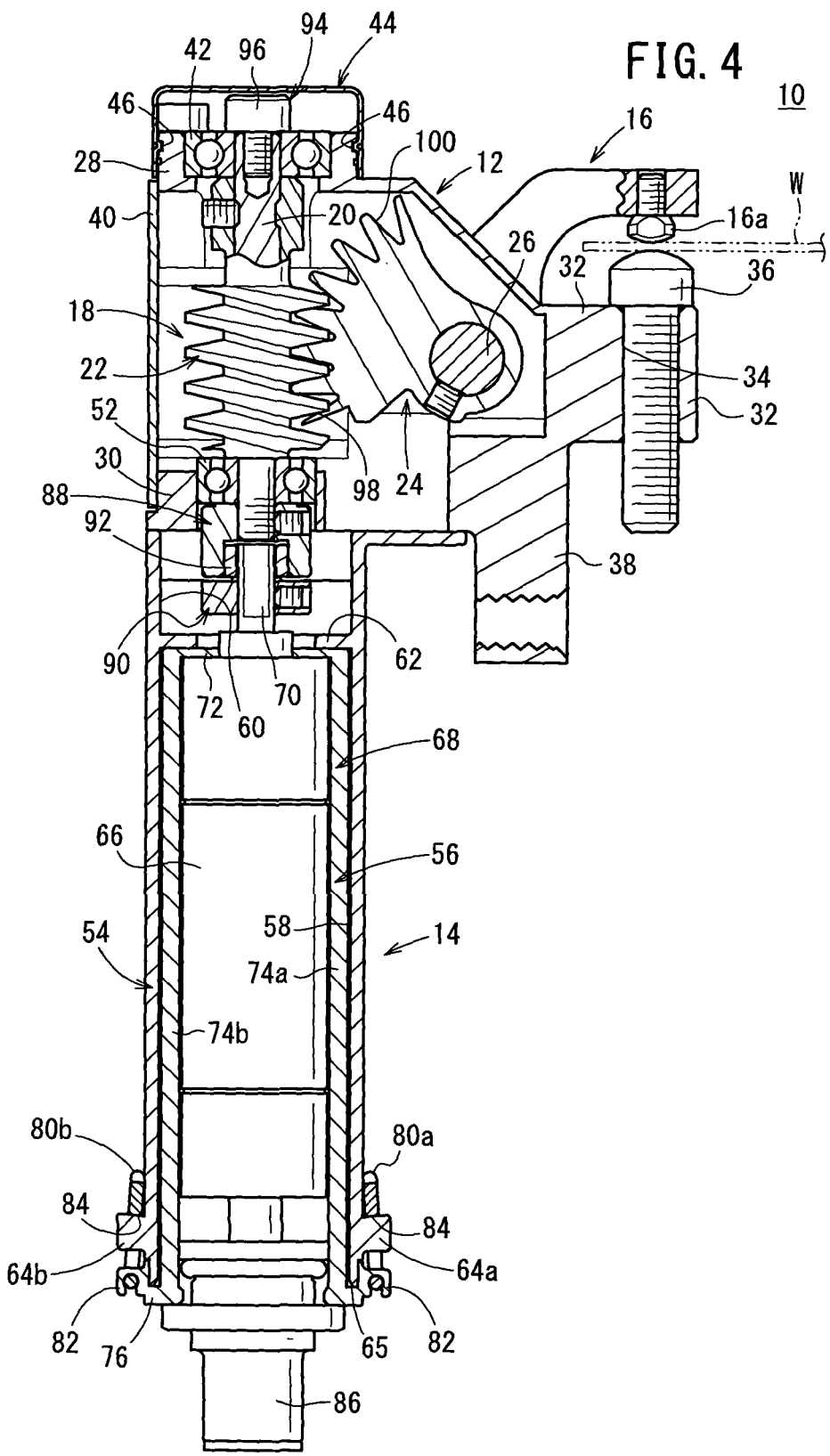
FIG. 4 is an overall vertical cross sectional view of the electric clamp apparatus of FIG. 3.

As shown in FIGS. 2, 4, and 7, the driving force transmission mechanism 18 includes the shaft 20, which is provided rotatably by means of the first and second bearings 42, 52 in the interior of the body 12, the worm gear 22 that is fixed with respect to the shaft 20, the worm wheel 24 enmeshed with the worm gear 22, a first connector 88 connected to the lower end of the shaft 20, a second connector 90 engaged with the drive shaft 70 of the motor 66, and a joint 92 that interconnects the first connector 88 and the second connector 90.

The shaft 20 is formed with a given length along the axial direction (the direction of arrow A or B), and is arranged to extend vertically in the interior of the body 12. Additionally, the upper end of the shaft 20 is supported rotatably with respect to the first bearing 42 provided in the first retaining member 28 of the body 12, whereas the lower end thereof is supported rotatably through the second bearing 52, which is installed in the second retaining member 30 of the body 12.

Further, the operation bolt 94 for manually operating the driving force transmission mechanism 18 including the shaft 20 is disposed on the upper end of the shaft 20. The operation bolt 94 includes a plate-shaped grip 96, which is screw-engaged coaxially with the shaft 20, projects upwardly, and extends along a straight line perpendicular to the axis of the shaft 20. In addition, by a non-illustrated operator gripping the grip 96 and rotating the operation bolt 94 in a predetermined direction, the shaft 20 can be rotated accompanied by concurrent rotation of the worm gear 22.

The aforementioned operation bolt 94 is not limited to the case of a grip 96 that projects perpendicularly, and for example, as shown in FIG. 8, an operation bolt 94a may be used having concave/convex splines (grooves) engraved on an outer circumferential surface thereof.

The worm gear 22, for example, is formed with a helical screw groove 98 on an outer circumferential surface of a cylindrical body. The shaft 20 is inserted through the center of the worm gear 22, the shaft 20 being connected integrally therewith by a retaining screw, which is screw-engaged in a radial direction from the outer circumferential surface of the worm gear 22. Consequently, the worm gear 22 is rotated integrally with the shaft 20. Further, the worm gear 22 is arranged in confronting relation to the outer circumferential surface of the worm wheel 24, such that gear teeth 100 of the worm wheel 24 are enmeshed with the screw groove 98. Owing thereto, upon rotation of the shaft 20 and the worm gear 22, and under a meshing action between the screw groove 98 and the gear teeth 100, the worm wheel 24 is rotated through a predetermined angle about the support shaft 26.

The worm wheel 24 is disposed at a substantially central position in the widthwise direction of the body 12, and is rotatable about the support shaft 26 that is pivotally supported in the body 12. The worm wheel 24 is formed, for example, with a fan shape in cross section with the support shaft 26 being connected to the radial center thereof. Plural gear teeth 100 are formed along an arcuate outer circumferential surface of the worm wheel 24. Further, end parts of the clamp arm 16 which has a U-shape in cross section are connected respectively to both ends of the support shaft 26, so that by rotation of the support shaft 26 through a predetermined angle, the clamp arm 16 also is moved in a pivoting manner.

As shown in FIG. 7, the first connector 88 is formed with a U-shape in cross section having a pair of first yokes 102. The first yokes 102 are oriented downward (in the direction of the arrow A) and are connected to the lower end of the shaft so as to be rotatable integrally with the shaft 20.

Similar to the first connector 88, the second connector 90 is formed with a U-shape in cross section having a pair a second yokes 104. The second yokes 104 are oriented upward (in the direction of the arrow B) and are inserted and connected with respect to the drive shaft 70. The drive shaft 70, which is formed with a semicircular shape in cross section, is inserted through the center of the second connector 90, whereby relative rotation mutually between the drive shaft 70 and the second connector 90 is restricted, and the second connector 90 rotates integrally with the drive shaft 70.

In this manner, as shown in FIG. 7, the first yokes 102 of the first connector 88, and the second yokes 104 of the second connector 90 are arranged in confronting relation to each other, such that when the shaft 20 and the drive shaft 70 are viewed in the axial direction, the first yokes 102 and the second yokes 104 are arranged in mutually different positions (see FIG. 9).

The joint 92 is formed with a cross-like shape having four legs 92a. The joint 92 is located between the first connector 88 and the second connector 90 and is disposed coaxially with the first and second connectors 88, 90. As shown in FIG. 9, the legs 92a are inserted respectively between the first yokes 102 and the second yokes 104 in the circumferential direction. Consequently, relative displacement in the direction of rotation of the first connector 88 and the second connector 90 is restricted by the joint 92, and the first and second connectors 88, 90 are rotationally displaced integrally with the joint 92.

As a result, by rotation of the drive shaft 70 of the motor 66, the shaft 20 is rotated integrally therewith through the second connector 90, the joint 92, and the first connector 88, accompanied by rotation of the worm gear 22.

The electric clamp apparatus 10 according to the embodiment of the present invention is constructed basically as described above. Next, operations and advantages of the electric clamp apparatus 10 will be described. In the following explanations, an unclamped condition, in which the clamping member 16a of the clamp arm 16 shown in FIGS. 1 and 2 is positioned substantially vertically and distanced from the support pin 36, will be treated as an initial position. Also, a thin plate-shaped workpiece W is mounted on an upper portion of the support pin 36.

At first, in the initial position of the electric clamp apparatus 10 shown in FIGS. 1 and 2, by inputting an electric signal from a non-illustrated controller with respect to the motor 66 of the drive unit 14, the drive shaft 70 of the motor 66 is rotated, accompanied by rotation of the worm gear 22 via the first and second connectors 88, 90 and the shaft 20.

Upon rotation of the worm gear 22, the worm wheel 24, with the gear teeth 100 thereof being enmeshed with the screw groove 98 of the worm gear 22, as shown in FIG. 2, is rotated clockwise about the support shaft 26, accompanied by the clamping member 16a of the clamp arm 16 being made to approach toward the side of the support pin 36.

Figure 3:
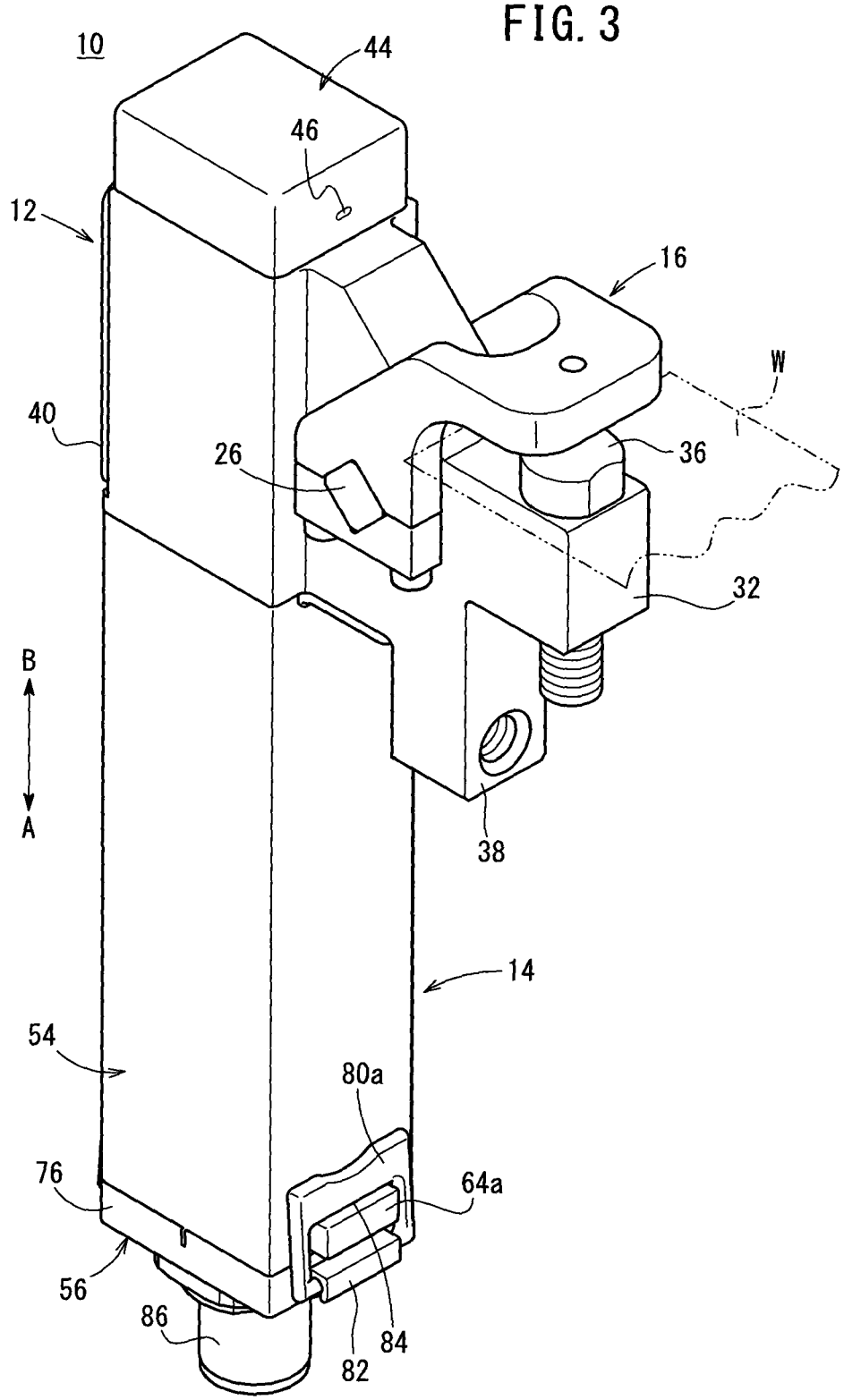
FIG. 3 is an exterior perspective view showing a clamped state of the electric clamp apparatus of FIG. 1.

By further driving the motor 66, the worm gear 22 is further rotated, accompanied by further clockwise rotation of the worm wheel 24, as shown in FIGS. 3 and 4. As a result, the clamping member 16a of the clamp arm 16 is brought into abutment from above with respect to the workpiece W, and a clamped state is brought about, as shown in FIGS. 3 and 4, in which the workpiece W is clamped between the clamping member 16a and the support pin 36.

Further, in the aforementioned clamped condition of the workpiece W, input of the electrical signal to the motor 66 from the non-illustrated controller is stopped, whereby a locked state is brought about in which rotational movement of the worm wheel 24 is restricted due to meshing of the gear teeth 100 of the worm wheel 24 with the screw groove 98 of the worm gear 22. Owing thereto, the clamped condition of the workpiece W by the clamp arm 16 can be maintained without requiring any locking means to be provided separately for restricting rotational movement of the clamp arm 16.

On the other hand, in the case that the clamped state of the workpiece W by the clamp arm 16, as shown in FIGS. 3 and 4, is to be released, the polarity of the electric signal, which is input from the non-illustrated controller with respect to the motor 66 of the drive unit 14, is reversed. As a result, the drive shaft 70 of the motor 66 is rotated in an opposite direction, accompanied by the worm gear 22 being rotated in the opposite direction through the shaft 20 and the first and second connectors 88, 90.

In addition, the worm wheel 24, which is enmeshed with the screw groove 98 of the worm gear 22, is rotated counterclockwise about the support shaft 26, whereby the clamping member 16a of the clamp arm 16 moves in a direction away from the workpiece W, and is restored to the unclamped state in which the clamped condition of the workpiece W by the clamping member 16a and the support pin 36 is released (see FIGS. 1 and 2).

For example, at a time when energization of the drive unit 14 is suspended, i.e., the drive unit 14 is deenergized due to a power failure or the like, since the motor 66 cannot be driven, as has been described above, for example, a clamped state can be maintained in which the workpiece W is clamped by the clamp arm 16. However, cases may occur in which, for some reason, it is desired to release the workpiece W from such a clamped state. Next, with reference to FIGS. 2 and 5, a case shall be explained in which a clamped state of the workpiece W is released at a time when the drive unit 14 is deenergized.

First, in the clamped state of the workpiece W shown in FIG. 2, an operator (not shown) grips the cover member 44 that covers the first retaining member 28 of the body 12, and as shown in FIG. 5, the cover member 44 is taken off upwardly (in the direction of the arrow B) from the first retaining member 28. More specifically, the projections 46 of the cover member 44 are detached from the grooves 48 of the first retaining member 28, whereby the cover member 44 is easily taken off from the body 12. Consequently, a condition is brought about, as shown in FIG. 5, in which the first retaining member 28 and the operation bolt 94 are exposed to the exterior.

Next, the non-illustrated operator grips the grip 96 of the operation bolt 94 and rotates the grip 96 in a predetermined direction, whereby the shaft 20 rotates together with the operation bolt 94 accompanied by rotation of the worm gear 22. Thus, under a meshing action between the screw groove 98 and the gear teeth 100, the worm wheel 24 and the clamp arm 16 are rotated counterclockwise through a predetermined angle. As a result, the clamped state of the workpiece W by the clamp arm 16 can be released by a manual operation of the operator.

More specifically, the operation bolt 94 functions as a manual operating means, which is capable of releasing the clamped condition of the workpiece W manually, without the need for a specialized tool or the like.

Next, a case will be described in which the motor unit 56 that makes up the drive unit 14 is taken out from the housing 54 and is replaced by a new different motor unit 56.

First, as shown in FIGS. 2, 4, and 10A, from a state in which the motor unit 56 is accommodated in the first accommodating section 58 of the housing 54, a non-illustrated operator grasps the two lock plates 80a, 80b, which are provided on the support members 82 of the frame 68, and the upper end sides of the lock plates 80a, 80b are rotated in directions away from the housing 54 about the lower end sides thereof that are supported on the support members 82 of the frame 68 (see FIG. 10B). Consequently, the holes 84 of the lock plates 80a, 80b are detached from the projections 64a, 64b of the housing 54, and the engaged state between the projections 64a, 64b and the holes 84 is released. More specifically, the movement restricted state of the motor unit 56 in the axial direction with respect to the housing 54 is released.

Next, the operator grips the holder 76 of the motor unit 56, and as shown in FIG. 10B, the holder 76 is pulled in a direction to separate away from the housing 54, i.e., in a downward direction (the direction of the arrow A), and the motor unit 56 is pulled out from the first accommodating section 58 of the housing 54. As a result, the second connector 90 that is connected to the drive shaft 70 of the motor 66 is detached from the joint 92, and the state of engagement between the second connector 90 and the joint 92 is released. Additionally, as shown in FIG. 5, removal of the motor unit 56 is completed, with a state in which the motor unit 56 is taken out completely to the exterior of the housing 54.

Next, a new different motor unit 56, which has been prepared beforehand, is installed in the housing 54. In this case, the drive shaft 70 of the motor unit 56 is inserted into the first accommodating section 58 so as to be arranged on the side of the housing 54 (in the direction of the arrow B), and the motor unit 56 is inserted in a direction along the first accommodating section 58. Further, as shown in FIG. 10B, the two lock plates 80a, 80b are kept in a lock-released state in which the upper end sides thereof are separated from the side wall portions 74a, 74b of the frame 68.

In addition, the motor unit 56 is further inserted into the interior of the housing 54, and the joint 92 is engaged with respect to the second connector 90 connected to the drive shaft 70, together with the second yokes 104 of the second connector 90 and the first yokes 102 of the first connector 88 coming into engagement in mutually different positions. Consequently, the drive shaft 70 of the motor 66 is connected to the driving force transmission mechanism 18, and a condition is brought about in which the driving force of the motor 66 can be transmitted to the driving force transmission mechanism 18. Further, the holder 76 of the frame 68 comes into abutment against the lower end of the housing 54.

Next, the operator (not shown) grips the pair of lock plates 80a, 80b and rotates upper end sides of the lock plates 80a, 80b about the lower end sides thereof in directions to approach the one side surface and the other side surface of the housing 54, thereby causing the projections 64a, 64b to be inserted through the holes 84 in engagement therewith (see FIG. 10A). As a result, the motor unit 56 is fixed to the housing 54 by the lock plates 80a, 80b, in a state such that the motor unit 56 is accommodated in the first accommodating section 58 of the housing 54.

In the foregoing manner, with the present embodiment, in the electric clamp apparatus 10 equipped with the drive unit 14 having the motor 66 driven by electric signals, the motor unit 56 including the motor 66, and the housing 54 in which the motor unit 56 is accommodated in the interior thereof are capable of being connected through the pair of lock plates 80a, 80b. Owing thereto, for example, in the case that maintenance involving exchange of the motor unit 56 or the like is to be carried out, with a simple operation of rotating the lock plates 80a, 80b to release the state of engagement of the lock plates 80a, 80b with respect to the projections 64a, 64b of the housing 54, the motor unit 56 can easily be removed from the housing 54.

As a result, for example, compared to an electric clamp apparatus in which the drive unit 14 is connected by bolts or the like with respect to the driving force transmission mechanism 18 or the body 12, a complex operation is not required in order to detach and remove the bolts, etc., and ease of maintenance of the electric clamp apparatus 10 can be enhanced significantly.

Stated otherwise, when maintenance is to be performed on the electric clamp apparatus 10, without requiring an operator (not shown) to use a special tool or the like, attachment and removal operations of the drive unit 14 can be carried out.

Further, in the electric clamp apparatus 10, simply by exchanging the motor unit 56 with a separate motor unit 56 having a motor 66 with a different output characteristic, a change in output of the drive unit 14 can easily be carried out, with the same body 12 including the driving force transmission mechanism 18. As a result, in the event that the clamping force imposed on the workpiece W by the clamp arm 16 is desired to be changed, by swapping in or exchanging another drive unit 14 that produces a different output, the clamping force imposed by the clamp arm 16 can easily be changed in a single electric clamp apparatus 10. More specifically, because there is no need to prepare multiple electric clamp apparatus 10 each with different output characteristics, a rise in equipment costs can be suppressed.

Furthermore, in the event that the clamp arm 16 is rotated manually by an operator, the cover member 44 is removed, and by rotating the operation bolt 94 manually without use of a tool or the like, the clamp arm 16 can easily be rotated in a desired direction, and the clamped state or the unclamped state of the clamp arm 16 can be released.

Moreover, the body 12 is not open to the exterior, and since the lid member 40 and the drive unit 14 close the opening of the space, respectively, a hermetically sealed condition can be maintained inside the space. As a result, for example, even in the case that water is used on an assembly line on which the electric clamp apparatus 10 is used, moisture can be prevented from infiltrating into the interior space, and spatter generated on a welding line or the like can also be prevented from entering the interior space.

Still further, the motor unit 56 can reliably be restricted from movement in the axial direction (the direction of the arrow A) with respect to the housing 54 by engagement of the pair of lock plates 80a, 80b with respect to the housing 54. Owing thereto, for example, even in the case that wires connected to the connector 86 of the holder 76 are pulled, and a pulling force is applied downwardly to the holder 76, the motor unit 56 including the holder 76 is prevented from slipping out mistakenly from the housing 54, and the retained state thereof can be preserved.

Further, the sealing ring 49 is installed on the first retaining member 28 on which the cover member 44 is mounted. In a state in which the cover member 44 is mounted on the body 12, infiltration of moisture or the like from the exterior is prevented by abutment of the sealing ring 49 against the inner wall surface of the cover member 44.

Furthermore, the sealing ring 65 is provided on the lower end of the housing 54, such that when the motor unit 56 is assembled with respect to the housing 54, the sealing ring 65 abuts against the holder 76, and since a sealed condition between the housing 54 and the motor unit 56 is ensured, infiltration of moisture or the like from the exterior is prevented.

The electric clamp apparatus according to the present invention is not limited to the aforementioned embodiment. It is a matter of course that various alternative or additional structures could be adopted without deviating from the essential scope of the invention as set forth in the appended claims.

The invention claimed is:

1. An electric clamp apparatus for gripping a workpiece by rotation of a clamp arm, comprising:
   a body;
   a drive unit including a drive source that is driven rotatably by an electric signal, the drive unit being attachable and detachable with respect to the body;
   a driving force transmission mechanism disposed in interior of the body, which transmits a rotary driving force of the drive unit to the clamp arm; and
   a connecting mechanism for switching a state of connection of the drive unit with respect to the body,
   wherein the drive unit is attachable and detachable with respect to the body by switching a state of connection of the drive unit through use of the connecting mechanism,
   wherein the connecting mechanism comprises:
      a projection formed on a side surface of the body; and
      an engagement unit disposed on the drive unit and capable of engagement with respect to the projection, wherein the projection projects in a direction perpendicular to a direction of insertion of the drive unit with respect to the body, and wherein in a case where the drive unit is inserted in the interior of the body, the body and the drive unit are connected in such a state that restricts axial movement of the drive unit with respect to the body by engagement of the engagement unit with respect to the projection.

2. The electric clamp apparatus according to claim 1, wherein the engagement unit is made up from a plate that is pivotally supported rotatably with respect to a side surface of the drive unit, and the axial movement of the drive unit with respect to the body is restricted by a hole formed in the plate coming into engagement with the projection.

3. The electric clamp apparatus of claim 1, wherein a manual operating unit is provided on the body, such that when the drive unit is not being driven, the clamp arm is rotated through the driving force transmission mechanism by manual operation of an operator, and an openable and closable cover member is disposed on the body in covering relation to the manual operating unit.

4. The electric clamp apparatus of claim 3, wherein the manual operating unit is disposed on an end of a shaft constituting part of the driving force transmission mechanism, and includes an operating member having a grip capable of being gripped by the operator, the manual operating unit being rotatably disposed through the operating member.

5. The electric clamp apparatus of claim 1, the driving force transmission mechanism comprising:

a worm gear having a helical screw groove formed on an outer circumferential surface thereof, the worm gear being rotated through a shaft under a driving action of the drive unit; and gear teeth connected to the clamp arm and engaged with the screw groove, wherein by rotation of the worm gear, the driving force is transmitted through the gear teeth to the clamp arm.

6. The electric clamp apparatus of claim 5, the driving force transmission mechanism further comprising:

a first connector connected to the shaft;

a second connector connected to a drive shaft of the drive unit; and a joint disposed between the first connector and the second connector, and which restricts relative displacement in a direction of rotation of the first connector and the second connector, wherein the rotary driving force is transmitted from the second connector to the first connector via the joint.

7. The electric clamp apparatus of claim 3, wherein a first seal member is disposed between the cover member and the body.

8. The electric clamp apparatus of claim 1, wherein the drive unit is made up of a motor unit which includes a motor as a drive source and a frame that retains the drive source, the motor and the frame being accommodated integrally in interior of a housing.

9. The electric clamp apparatus of claim 1, wherein a support member disposed on the body projects outwardly with respect to a side of the body so that a workpiece is clamped between a clamping member of the clamp arm and the support member.

* * * * *